United States Patent
Ocak et al.

(10) Patent No.: US 11,133,945 B2
(45) Date of Patent: Sep. 28, 2021

(54) ONLINE CHARGING OF RO FAIL-OPEN SESSIONS

(71) Applicant: T-Mobile USA, Inc., Bellevue, WA (US)

(72) Inventors: Omer Ocak, Seattle, WA (US); Kashif Nadeem, Bellevue, WA (US); Saad Hamid, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 182 days.

(21) Appl. No.: 16/513,501

(22) Filed: Jul. 16, 2019

(65) Prior Publication Data

US 2021/0021436 A1 Jan. 21, 2021

(51) Int. Cl.
*H04L 12/14* (2006.01)
*H04W 4/24* (2018.01)
*H04W 80/10* (2009.01)

(52) U.S. Cl.
CPC .......... *H04L 12/1403* (2013.01); *H04W 4/24* (2013.01); *H04L 12/1442* (2013.01); *H04W 80/10* (2013.01)

(58) Field of Classification Search
CPC .......... H04L 12/14; H04W 4/24; H04W 80/10
See application file for complete search history.

(56) References Cited

U.S. PATENT DOCUMENTS

| 9,830,214 | B1* | 11/2017 | McGinn | G06F 11/0709 |
| 2009/0305684 | A1* | 12/2009 | Jones | H04L 63/20 455/418 |
| 2012/0129490 | A1* | 5/2012 | Sharma | H04L 12/1414 455/406 |
| 2012/0140665 | A1* | 6/2012 | Li | H04W 72/087 370/252 |
| 2015/0222442 | A1* | 8/2015 | Baer | H04L 12/1467 370/259 |
| 2016/0007390 | A1* | 1/2016 | Starsinic | H04L 61/106 370/328 |
| 2018/0241886 | A1* | 8/2018 | Zevallos | H04L 12/1403 |
| 2019/0259097 | A1* | 8/2019 | Raleigh | G06Q 20/0855 |

OTHER PUBLICATIONS

Hakala, et al, RFC4006 Diameter Credit-Control Application, Network Working Group, Aug. 2005, pp. 1-114 (Year: 2005).*

* cited by examiner

*Primary Examiner* — Kent Krueger
(74) *Attorney, Agent, or Firm* — Lee & Hayes, P.C.

(57) ABSTRACT

Techniques for allowing online charging in cases where the online charging system (OCS) is unreachable or partially unreachable are discussed herein. For example, when the OCS cannot be reached and is unable to authorize the requested services, the services can be provided (e.g., a voice communication session established between two devices) without having to wait for authorization from the OCS. Upon completion of the communication session, the OCS is contacted to report the actual number of units used during the session so that the account of the subscriber can be adjusted. In some examples, the IMS tags the CDR provided to the billing system to indicate that the OCS was not able to authorize the communication session. In this way, the billing system is notified that the OCS is to be contacted so that the subscriber's balance can be adjusted.

16 Claims, 5 Drawing Sheets

ONLINE CHARGING OF RO FAIL-OPEN SESSIONS

BACKGROUND

Many user devices configured for telecommunications, such as smartphones, are capable of communicating via various types of networks and service plans. For example, cellular and other portable devices may connect with circuit-switched (CS) networks such as the Global System for Mobile Communications (GSM) or more recent packet-switched (PS) networks such as Long Term Evolution (LTE) or other Internet Protocol (IP)-based networks. In addition to connecting to different types of networks, the user devices may also be configured to work with various types of service plans, such as a subscription service or a prepaid service.

Before a subscriber of a wireless service provider is allowed to access a prepaid service, an Online Charging System (OCS) determines whether to authorize the requested service. For instance, the OCS may determine that the subscriber has a sufficient number of units to cover the cost of the requested service. If not, the OCS does not authorize the subscriber to access the service. In some cases, however, even when the subscriber has the number of units to cover the cost, the OCS may not be available, or does not timely respond to a service request, thereby causing the OCS to not authorize the subscriber to access the service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Technologies and techniques are described to authorize a subscriber of a wireless service provider to access a service even though an Online Charging System (OCS) is totally or partially unavailable. Generally, an OCS performs real-time credit-based charging for subscribers. The OCS keeps track of subscriber account balances as well as other information related to the subscribers (e.g., what a subscriber is charged for a particular service).

Before delivering services to a subscriber, the OCS is contacted to determine whether the subscriber has enough units to pay for the requested service as well as to reserve units before delivering the requested service. Under normal operating conditions, an application server of the IMS (IP Multimedia Subsystem) triggers a charging request towards the OCS using the Ro protocol. The OCS determines how much the requested service will cost and whether the subscriber has the sufficient number of units for the requested service. When the subscriber has sufficient units, the requested service is authorized, and the OCS deducts the amount from the account of the subscriber. At the end of the session, a Call Detail Record (CDR) that includes detailed information associated with the requested service, such as a communication session, is transmitted by the IMS to a billing system.

In some cases, however, the OCS may not be available (or may be partially available). When the OCS cannot be reached and is unable to authorize the requested service, the requested service can be provided (e.g., a communication session established between two devices) without having to wait for authorization from the OCS. Upon completion of the service, the billing system, or some other component contacts the OCS to report that a service has been provided without pre-authorization from the OCS along with the actual number of units used during the session so that the account of the subscriber can be adjusted.

In some examples, when the OCS was not able to authorize the requested service (which may also be referred to herein as a "communication session"), the IMS tags the CDR provided to the billing system to indicate that the OCS was not able to authorize the communication session. In this way, the billing system is notified that the OCS is to be contacted so that the subscriber's balance can be adjusted. Using the techniques described herein, a requested service can be provided without pre-authorization from the OCS. The systems, devices, and techniques described herein can be implemented in a number of ways. Example implementations are provided below with reference to the following figures.

Figure 1:
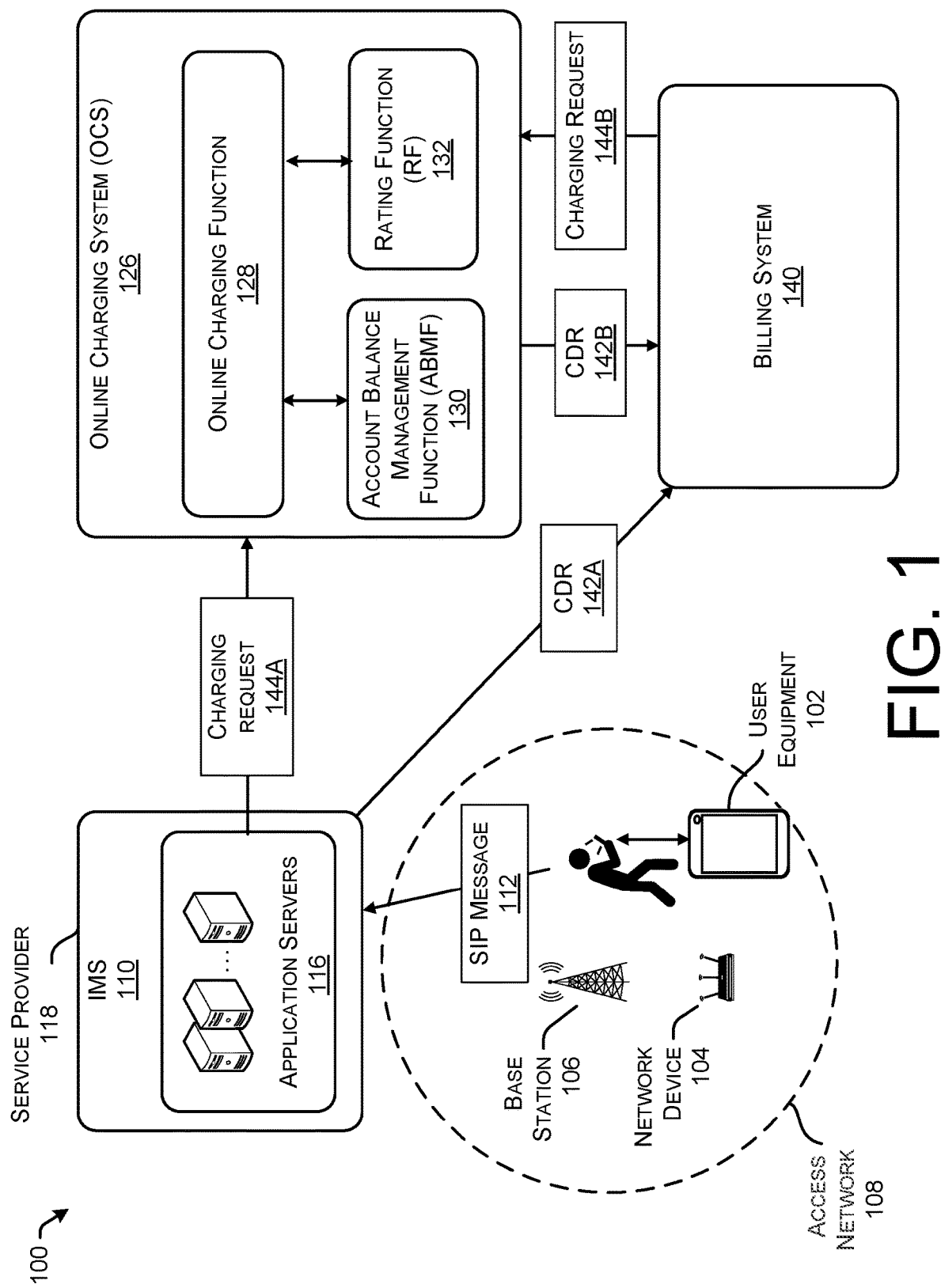
FIG. 1 illustrates an example system for authorizing a subscriber of a wireless service provider to access a service even though an Online Charging System (OCS) is totally or partially unavailable.

FIG. 1 illustrates an example system 100 for authorizing a subscriber of a wireless service provider to access a service even though an Online Charging System (OCS) 126 is totally or partially unavailable according to some examples. As shown in FIG. 1, the system 100 may include a user equipment (UE) 102, a network device 104, a base station 106, an Internet Protocol (IP) Multimedia Subsystem (IMS) 110, an OCS 126, a billing system 140. In some examples, the network device 104 and the base station 106 may be associated with an access network, such as access network 108.

In general, the network device 104 can be implemented as a variety of technologies to provide wired and/or wireless access to various types of networks for transmitting and receiving data (e.g., data packets), including networks using technologies such as Institute of Electrical and Electronics Engineers (IEEE) 802.11 ("Wi-Fi"), IEEE 802.15.1 ("Bluetooth"), Asynchronous Transfer Mode (ATM), Internet Protocol (IP), and the like.

The term "data network" may refer to the data packets that are transmitted and received within the networks. The data packets may be used to carry voice traffic using VoIP or other technologies as well as data traffic. Moreover, the network devices 104 may communicatively couple to a telephony application server (TAS) in any manner, such as by a wired or wireless connection. The network device 104 can be associated with access network 108.

In general, the base station 106 can be implemented as a variety of technologies to provide wired and/or wireless access to the network, as discussed herein. In some instances, the base station 106 can include a 3GPP RAN, such a GSM/EDGE RAN (GERAN), a Universal Terrestrial RAN (UTRAN), an evolved UTRAN (E-UTRAN), or a New Radio (5G) RAN, or alternatively, a "non-3GPP" RAN, such as a Wi-Fi RAN, or another type of wireless local area network (WLAN) that is based on the IEEE 802.11 standards. Further, the base station 106 can include any number and type of transceivers and/or base stations representing any number and type of macrocells, microcells, picocells, or femtocells, for example, with any type or amount of overlapping coverage or mutually exclusive coverage. The base station 106 can be associated with access network 108.

In some instances, the environment 100 can further include one or more servers, including application servers 116, to facilitate communications by and between the various devices in the environment 100. That is, environment 100 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Thus, the environment 100 may implement GSM, UMTS, and/or LTE/LTE Advanced telecommunications technologies.

The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device 104, the base station 106, and one or more endpoints of the network (e.g., U-TAS 116, C-TAS 120, servers, websites, etc.).

While FIG. 1 illustrates an example environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

The access network 108 can be any sort of access network, such as a GSM or UMTS network. The access network 108 can include any aspects of one or more of second, third, fourth generation, and fifth generation (2G, 3G, 4G, and 5G) cellular-wireless access technologies. The access network 108 can also be referred to as a universal terrestrial radio network (UTRAN) or a GSM EDGE radio access network (GERAN) and can include a base station, as well as a radio network controller (RNC).

Examples of the user equipment (UE) 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 102 include, but are not limited to, smart devices such as televisions, music players, or any other electronic appliances that can generate, request, receive, transmit, or exchange voice, video, and/or digital data over a network.

The UE 102 can further be configured to establish or receive a communication session, such as a VoLTE, VoNR, VoWifi, or other voice call, a video call, or another sort of communication. Establishment of such sessions can involve communication clients and Session Initiation Protocol (SIP) clients to communicate with the telecommunications network.

The UE 102 can communicate ongoing SIP messages (e.g., SIP Message 112) to one or more application servers 116 to provide data utilized to identify charging parameters associated with the communication session. For instance, the UE 102 may send SIP Message 112 to an application server 116 when requesting a service, such as a communication session between two or more computing devices. Other messages, not shown, may be sent during the communication session.

The online charging system (OCS) 126 may include the online charging function (OCF) 128, the account balance management function (ABMF) 130, and the rating function (RF) 130. As briefly discussed above, the OCS 126 can be utilized to determine online charging for a communication session initiated from the UE 102.

The billing system 140 is configured to provide billing services associated with providing requested services, such as communication sessions. Generally, the billing system 140 may be configured to receive usage data for subscribers of a wireless service provider, such as service provider 118.

In some configurations, the billing system 140 receives a call detail record (CDR) 142A from the IMS 110 after a communication session is completed. As briefly discussed above, the CDR 142A provides details associated with the communication session. The billing system 140 can also be configured to determine charges for different subscriber accounts, preparing and delivering bills, and the like. As will be discussed in more detail below, in some configurations, the billing system 140 can be configured to contact the OCS 126 to obtain charging data for a communication session that was not pre-authorized by the OCS 126.

The following is an example of establishing a communication session even though the OCS did not authorize the communication session. A subscriber associated with the UE 102 may be in communication with application servers 116 through the network device 104 or the base station 106. The UE 102 can transmit the SIP Message 112 to the IMS 110, which is received by one of the application servers 116, to provide the information required for initiating the communication session.

In some examples, after receiving the request for to establish a communication session (i.e., a "chargeable event"), the IMS 110 transmits a charging request 144A to the OCS 126 via the Ro protocol to request authorization for the communication session. When the OCS 126 is operating under normal operating conditions, the OCF 128 contacts the rating function (RF) 132 to determine how many units to charge for the communication session. In some examples, the RF 132 calculates the price of non-monetary units to charge the subscriber for the communication session. Different subscribers may be charged different amounts. The OCS 126 then contacts the ABMF 130 to determine whether the subscriber associated with UE 102 has sufficient available units for the requested communication session.

When the subscriber has sufficient available units to cover the cost of the communication session, the requested service is authorized by the OCS 126 and the ABMF 130 deducts the determined number of units for the communication session from the account of the subscriber. At the end of the communication session, the IMS 110 forwards a CDR 142A for the session to the billing system 140.

In some cases, however, the OCS 126 may not be available (or may be partially available). When the OCS 126 cannot be reached and is unable to authorize the requested services, the requested services can be provided (e.g., a voice communication session established between two devices) without having to wait for authorization from the OCS 126. Upon completion of the communication session, the charges are reconciled.

In some examples, when the OCS 126 is unavailable or partially available, the CDR 142A provided to the billing system by the IMS 110 is 'tagged" to indicate that the OCS 126 was not able to authorize the communication session. In this way, the billing system 140, or some other component or system, can obtain the charges associated with the communication session. According to some configurations, the billing system 140 transmits a charging request 144B to the OCS 126 to report that the communication session has occurred, along with other data associated with the communication session, such as but not limited to the actual number of units used so that the account of the subscriber can be adjusted. The OCS 126 may transmit the CDR 142B that includes the updated information for the communication session. More details are provided below.

Figure 2:
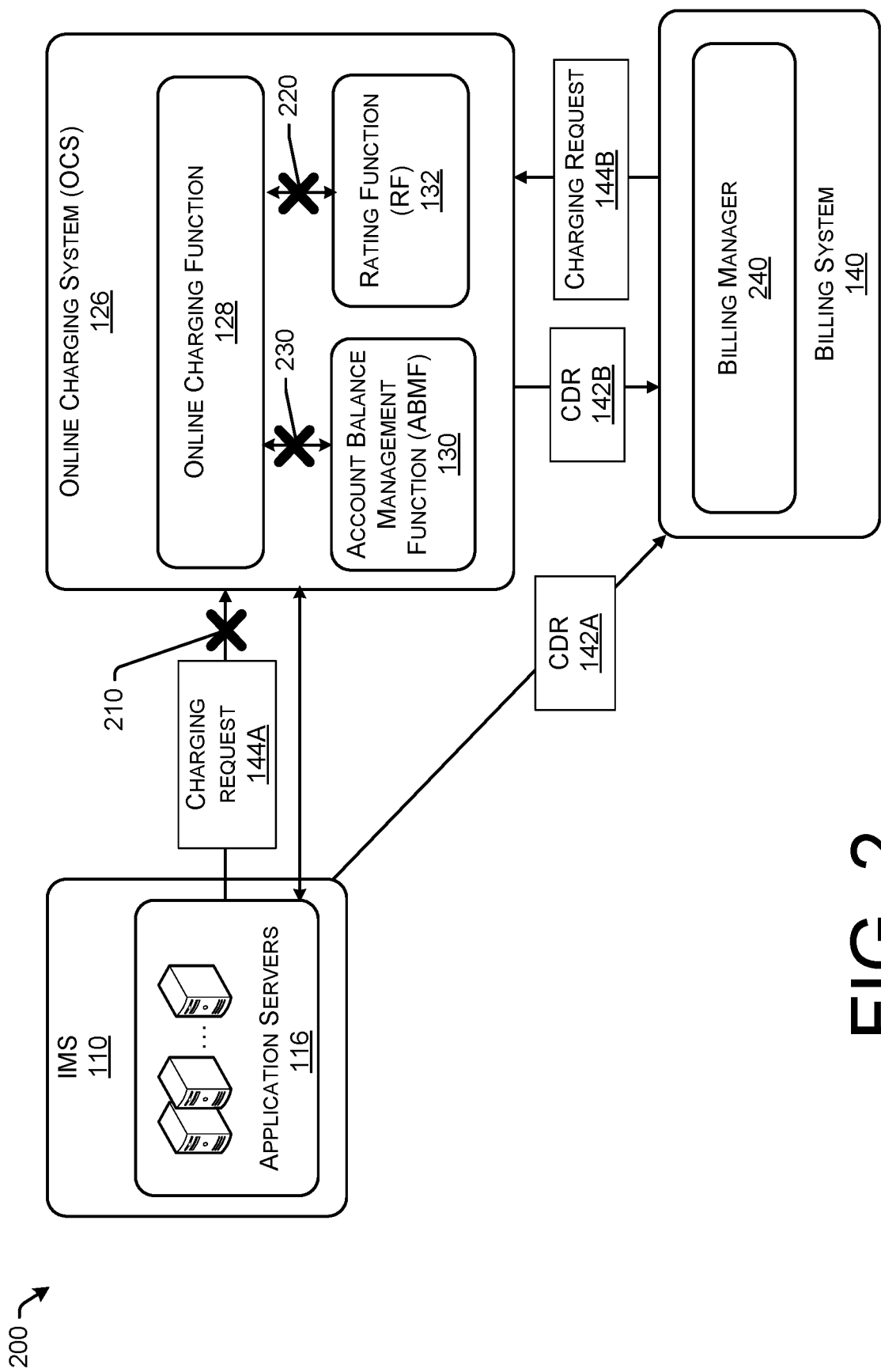
FIG. 2 illustrates an example system that shows examples of authorizing a subscriber of a wireless service provider to access a service even though an Online Charging System (OCS) is totally or partially unavailable.

FIG. 2 illustrates an example system 200 that authorizes a subscriber of a wireless network to access a service even though an Online Charging System (OCS) 126 is totally or partially unavailable. FIG. 2 is similar to FIG. 1 but does not illustrate the UE 102, the network device 104, the base station 106, and the access network 108.

As discussed briefly above, in some cases, the OCS 126 may not be available (or may be partially available). For example, the OCS 126 may be unreachable as indicated by 210, the ABMF 130 may be unreachable as indicated by 230, and/or the rating function 132 may be unreachable as indicated by 220. In the example of the OCS 126 being unreachable, the OCS 126 will not receive the charging request 144A message and will not be able to respond to the IMS 110 regarding the charging request 144A. The OCS 126 may be unreachable due to network problems, hardware problems, and the like.

In the example of the OCS 126 being reachable, but one or both of the ABMF 130 or the RF 132 being unreachable, the OCS 126 will not be able to determine if the subscriber associated with the UE 102 has enough units for the requested communication session, and/or be able to adjust the account balance of the subscriber. In the example of the ABMF 130 and/or the RF 132 being unreachable or not operating properly, the OCS 126 may respond to the IMS 110 that the communication session is not authorized since the OCF 128 could not communicate with (or receive a reply) from the RF 132 and/or the ABMF 130. The IMS 110 may receive this information from the OCS 126 and may determine to authorize the communication session anyway.

When the OCS 126 cannot be reached, or can be reached, but is unable to authorize the requested services, the requested services can be provided (e.g., a voice communication session established between two devices). Upon completion of providing the requested services during the communication session, the charges are reconciled by contacting the OCS 126 and instructing the OCS 126 to adjust the account of the subscriber.

In some configurations, when the OCS 126 is unavailable or partially available, the CDR 142A provided to the billing system 140 by the IMS 110 is 'tagged" to indicate that the OCS 126 was not able to authorize the communication session. In this way, the billing system 140, or some other component or system, can obtain the charges associated with the communication session. According to some configurations, the billing manager 240 generates a charging request 144B using the CDR 142A.

The billing manager 240 then transmits the charging request 144B to the OCS 126. The charging request 144B can report the occurrence of the communication session, the actual number of units used during the communication session, and the like so that the account of the subscriber can be adjusted. The CDR 142B can be used by the billing system 140 to charge the subscriber for the communication session.

If the OCS 126 is still not available after the end of the communication session, the billing manager 240, or some other component may re-transmit the charging request 144B until the OCS 126 becomes available again.

Figure 3:
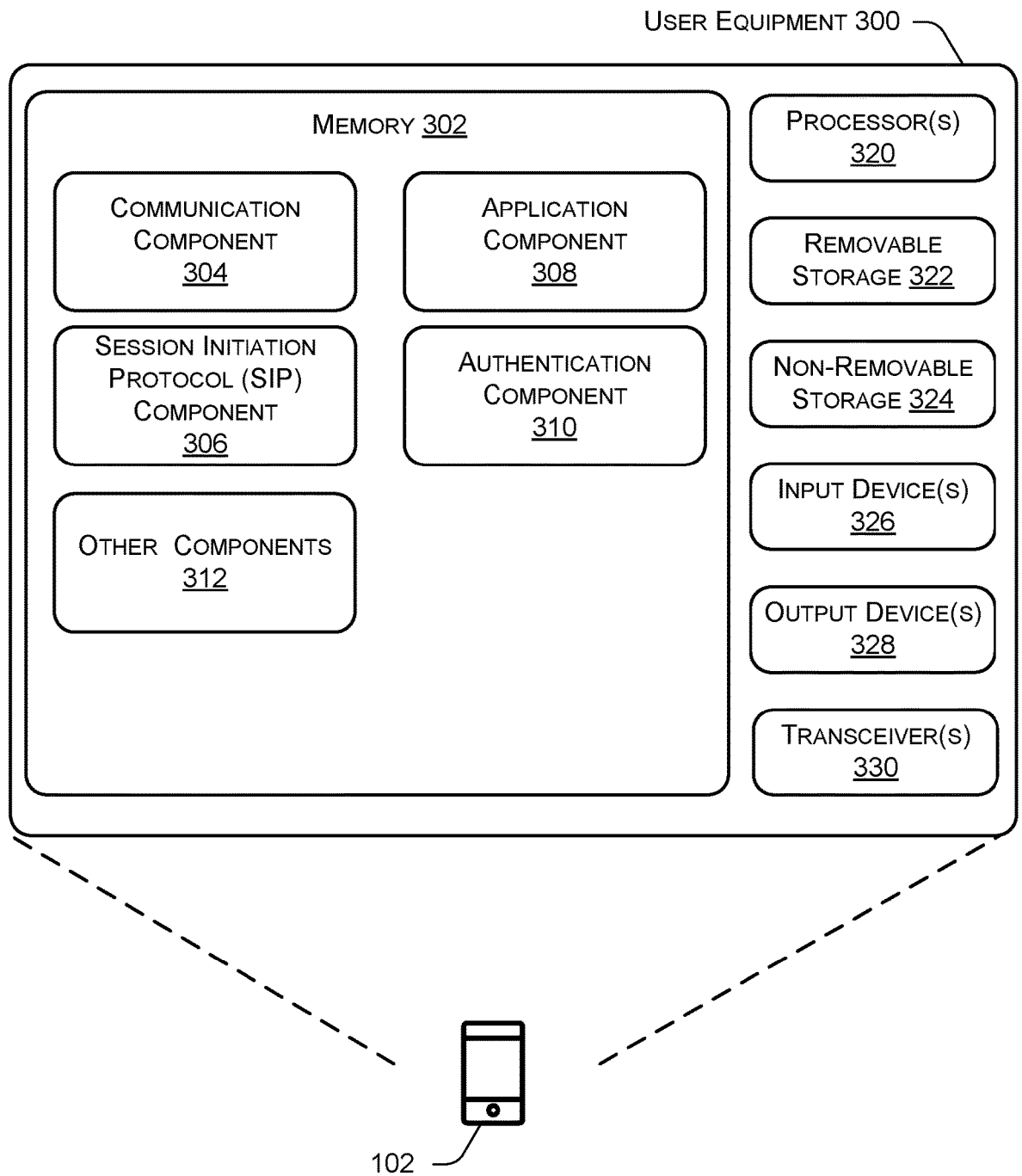
FIG. 3 illustrates an example user device configured to implement functionality relating to utilizing online charging.

FIG. 3 illustrates an example user equipment (UE) 300 configured to implement online charging. In some embodiments, the UE 300 can correspond to the UE 102 of FIG. 1. It is to be understood in the context of this disclosure that the UE 300 can be implemented as a single device or as a plurality of devices with components and data distributed among them.

As illustrated, the UE 300 comprises a memory 302 storing the communication component 304, a session initiation protocol (SIP) component 306, an application component 308, an authentication component 310, and other components 312. Also, the UE 300 includes processor(s) 320, a removable storage 322 and non-removable storage 324, input device(s) 326, output device(s) 328, and transceiver(s) 330.

In various embodiments, the memory 302 is volatile (such as RAM), non-volatile (such as ROM, flash memory, etc.) or some combination of the two. The communication component 304, the SIP component 306, the application component 308, the authentication component 310, and the other components 312 stored in the memory 302 can comprise methods, threads, processes, applications, or any other sort of executable instructions. The communication component 304, the SIP component 306, the application component 308, the authentication component 310, and the other components 312 can also include files and databases.

The communication component 304 may include functionality to send and receive communication (e.g., a voice call, an SMS, or an MMS) and/or perform other operations. In some examples, the communication component 304 may perform a number of functions, such as interfacing with the transceiver(s) 330, preparing the user equipment 300 to receive or handover a call, tuning the transceiver(s) 330, receiving and processing an invitation message such as a SIP Message 112 received via the transceiver(s) 330, transmitting other messages via the transceiver(s) 330, detecting a failure condition, and the like.

The SIP component 306 may be an application that enables calls to be served via Voice over Internet Protocol (VoIP) using Session Initiation Protocol (SIP) signaling. The SIP component 306 may determine a current location of the user equipment 300 using a Global Positioning System (GPS).

The application component 308 may display various information associated with a communication session. The application component 308 may provide a portal for the user to sign up for services with a service provider (e.g., Service Provider A 118). In various examples, the application component 308 may provide an interface for the user(s) to register new user accounts and download one or more applications associated with the service provider, such as the authentication component 210. The application component 308 may communicate with servers of the service provider for the user equipment(s) 102 through the communication component 304 to receive or update user settings.

The authentication component 310 may perform various types of authentication. The authentication component 310 may interact with the database(s) to store, retrieve, and update the database(s) containing user subscription information, including items such as user identification and addressing (e.g., the IMSI (International Mobile Subscriber Identity) and MSISDN (Mobile Subscriber ISDN Number)), user profile information (e.g., subscription data). The authentication component 310 may also be configured to perform other operations.

The authentication component 310 may authenticate the UE 300 to send and receive communication using a user account. Upon a restart of the UE 300, the communication component 304 may automatically send a request to the authentication component 310 to authenticate the UE 300 and reconnect the UE 300 to send and receive communication through the service provider. The other components 312 may perform other operations. In some embodiments, the processor(s) 320 is a central processing unit (CPU), a graphics processing unit (GPU), or both CPU and GPU, or other processing unit or component known in the art.

The UE 300 also includes additional data storage devices (removable and/or non-removable) such as, for example, magnetic disks, optical disks, or tape. Such additional storage is illustrated in FIG. 3 by removable storage 322 and non-removable storage 324. Tangible computer-readable media can include volatile and nonvolatile, removable and non-removable media implemented in any method or technology for storage of information, such as computer readable instructions, data structures, program modules, or other data. The memory 302, the removable storage 322 and the non-removable storage 324 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by the UE 300. Any such tangible computer-readable media can be part of the UE 300.

The UE 300 can include input device(s) 326, such as a keypad, a cursor control, a touch-sensitive display, etc. Also, the UE 300 can include output device(s) 328, such as a display, speakers, etc. These devices are well known in the art and need not be discussed at length here.

As illustrated in FIG. 3, the UE 300 can include one or more wired or wireless transceiver(s) 330. In some wireless embodiments, to increase throughput, the transceiver(s) 330 can utilize multiple-input/multiple-output (MIMO) technology. The transceiver(s) 330 can be any sort of wireless transceivers capable of engaging in wireless, radio frequency (RF) communication, as discussed herein. The transceiver(s) 330 can also include other wireless modems, such as a modem for engaging in Wi-Fi, WiMAX, Bluetooth, infrared communication, or the like.

Figure 4:
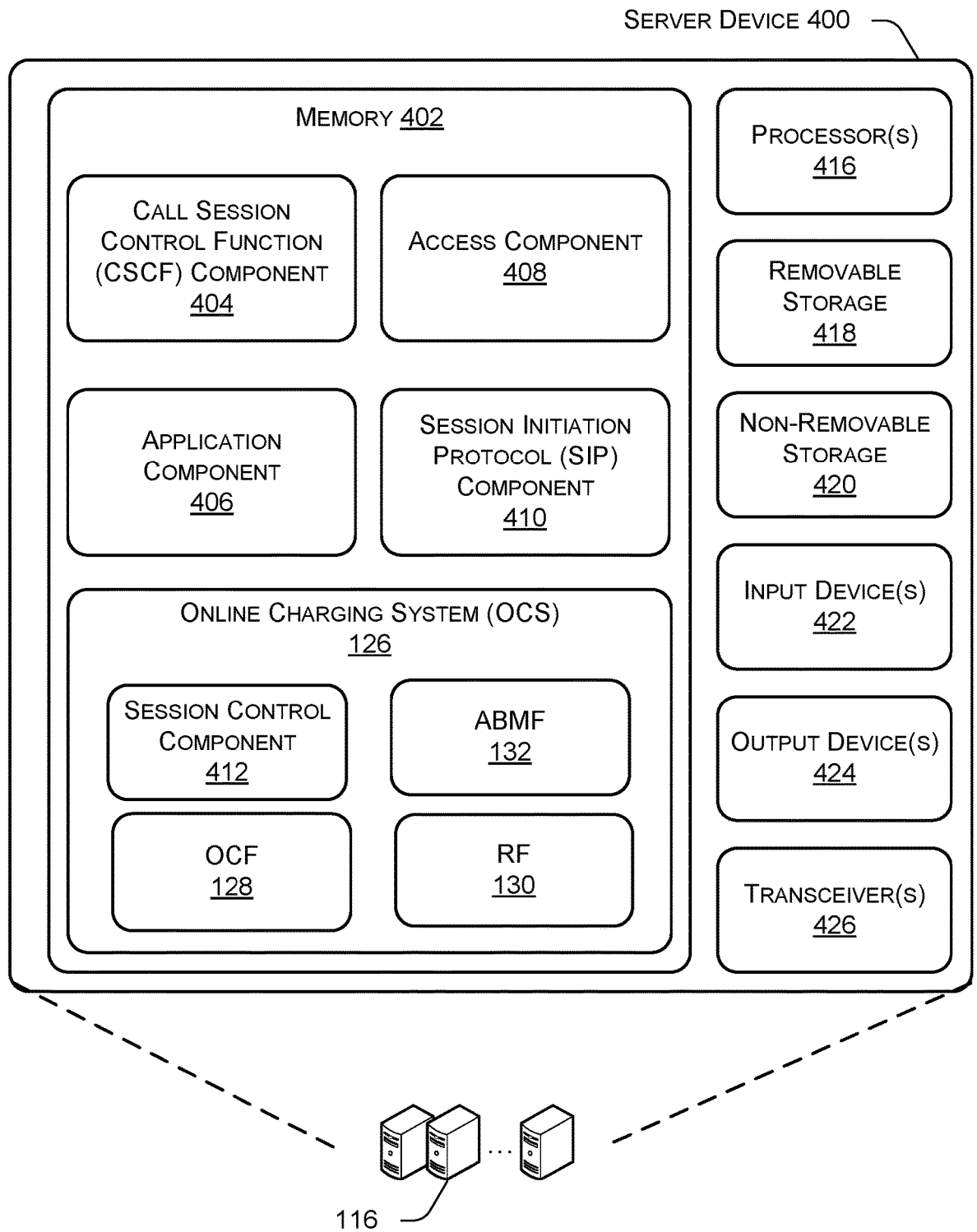
FIG. 4 illustrates an example server device configured to implement functionality related to online charging.

FIG. 4 illustrates an example server device 400 configured to implement online charging, in accordance with embodiments of the disclosure. In some embodiments, the server device 400 can correspond to the application servers 116, or servers (not shown) associated with the OCS 126 of FIG. 1 or FIG. 2. It is to be understood in the context of this disclosure that the server device 400 can be implemented as a single device or as a plurality of devices with components and data distributed among them.

As illustrated, the server device 400 comprises a memory 402 storing the call session control function (CSCF) component 404, the application component 406, the access component 408, the session initiation protocol (SIP) component 410, and the online charging system (OCS) 126. The online charging system (OCS) 126 further includes the session control component 412, the ABMF 132, the OCF 128, and the RF 130. Also, the server device 400 includes processor(s) 416, a removable storage 418 and non-removable storage 420, input device(s) 422, output device(s) 424, and transceiver(s) 426.

In various embodiments, the memory 402 is volatile (such as RAM), non-volatile (such as ROM, flash memory, etc.) or some combination of the two. The call session control function (CSCF) component 404, the application component 406, the access component 408, the SIP component 410, and the online charging system (OCS) 126 stored in the memory 402 can comprise methods, threads, processes, applications, or any other sort of executable instructions. The CSCF component 404, the application component 406, the access component 408, the SIP component 410, and the OCS 126 can also include files and databases.

The call session control function (CSCF) component 404 may include functionality to send and receive communication (e.g., a voice call, an SMS, or an MMS) and/or determine when to transition an existing communication from one access network to another. In some examples, the CSCF component 404 may perform a number of functions, such as interfacing with the transceiver(s) 426, preparing the user equipment 300 to receive or handover a call, tuning the transceiver(s) 426, receiving and processing a message such as a SIP Message 112 received via the transceiver(s) 326, transmitting other messages via the transceiver(s) 326, and the like.

The application component 406 may serve as a portal for the user to sign up for services with a service provider (e.g., Service Provider 118). In various examples, the application component 406 may provide an interface for the user(s) to register new user accounts and download one or more applications associated with the service provider. The application component 406 may communicate with user equipment 102 and/or 300 to receive or update user settings.

The access component 408 may handle incoming calls and route the call to the appropriate device. The session initiation protocol (SIP) component 410 may be an application that utilize SIP information (SIP INFO) and/or SIP message (SIP MESSAGE) for different telephony application servers (TASs) to communicate with other servers or user devices. The SIP information and/or SIP message may include information related to requests or methods for serving (e.g., initiating, receiving, maintaining, updating, terminating, etc.) communication sessions.

The online charging system (OCS) 126 may include the session control component 412, the authorization component 414, the OCF 128, the RF 130, and the ABMF 130. The OCS 126 allows the server device 400 to act as a diameter client for the Ro interface which handles online charging sessions.

The ABMF 132 may interact with the OCF 128 to determine whether the user account associated with the served number has enough units to initiate and/or maintain a communication session. The ABMF 132 may interact with the database(s) to store, retrieve, and update the database(s) containing user account balance and subscription information, including items such as user identification and addressing (e.g., the IMSI (International Mobile Subscriber Identity) and MSISDN (Mobile Subscriber ISDN Number)), user profile information (e.g., subscription data). The ABMF 132 may also be configured to perform other operations.

The OCF 128 may include rules for charging a session based on various charging parameters. The OCF 128 may determine a rating function 130 to charge a user account. In an example, the RF 130 may determine to charge a first rate based on the first access network type such as VoLTE and to charge a second rate based on the second access network type such as VoWifi. The OCF 128 may use the current rate as determined by the RF 130 to determine an ongoing charge for the current communication session and charge the user account appropriately. In some embodiments, the processor(s) 416 is a central processing unit (CPU), a graphics processing unit (GPU), or both CPU and GPU, or other processing unit or component known in the art.

The server device 400 also includes additional data storage devices (removable and/or non-removable) such as, for example, magnetic disks, optical disks, or tape. Such additional storage is illustrated in FIG. 4 by removable storage 418 and non-removable storage 420. Tangible computer-readable media can include volatile and non-volatile, removable and non-removable media implemented in any method or technology for storage of information, such as computer readable instructions, data structures, program modules, or other data. The memory 402, the removable storage 418 and the non-removable storage 420 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the server device 400. Any such tangible computer-readable media can be part of the server device 400.

The server device 400 can include input device(s) 422, such as a keypad, a cursor control, a touch-sensitive display, etc. Also, the server device 400 can include output device(s) 424, such as a display, speakers, etc. These devices are well known in the art and need not be discussed at length here. The server device 400 may be configured to communicate over a telecommunications network using any common wireless and/or wired network access technology. Moreover, the server device 400 may be configured to run any compatible device operating system (OS), including but not limited to, Microsoft Windows Mobile, Google Android, Apple iOS, Linux Mobile, as well as any other common mobile device OS.

The server device 400 also can include input device(s) 422, such as a keypad, a cursor control, a touch-sensitive display, voice input device, etc., and output device(s) 424 such as a display, speakers, printers, etc. These devices are well known in the art and need not be discussed at length here.

As illustrated in FIG. 4, the server device 400 also includes one or more wired or wireless transceiver(s) 426. For example, the transceiver(s) 426 can include a network interface card (NIC), a network adapter, a LAN adapter, or a physical, virtual, or logical address to connect to various networks, network devices, illustrated in the environment 100, for example. To increase throughput when exchanging wireless data, the transceiver(s) 426 can utilize multiple-input/multiple-output (MIMO) technology. The transceiver(s) 426 can comprise any sort of wireless transceivers capable of engaging in wireless, radio frequency (RF) communication. The transceiver(s) 426 can also include other wireless modems, such as a modem for engaging in Wi-Fi, WiMAX, Bluetooth, infrared communication, and the like.

Figure 5:
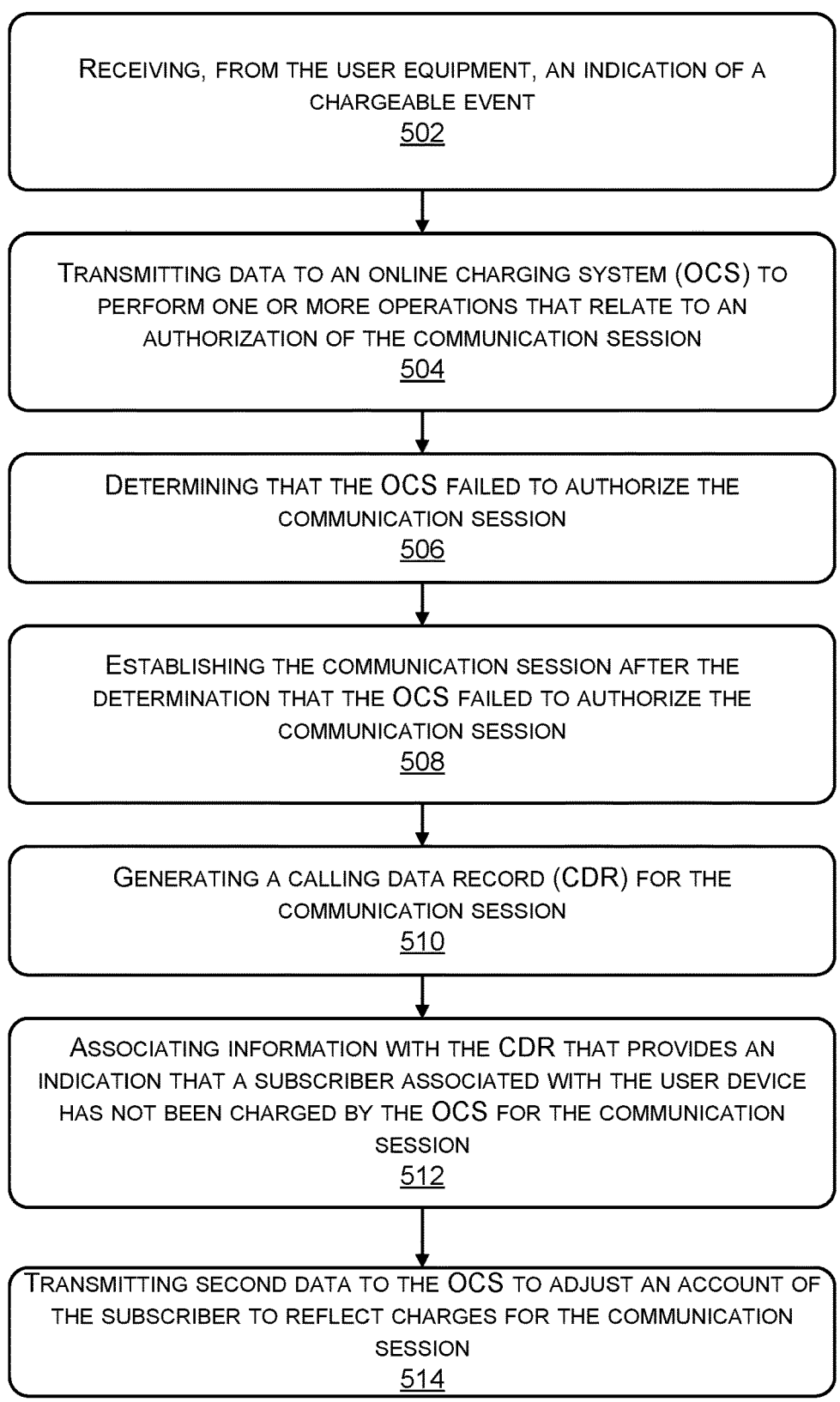
FIG. 5 illustrates an example process for authorizing a subscriber of a wireless service provider to access a service even though an Online Charging System (OCS) is totally or partially unavailable.

FIG. 5 illustrates an example process 500 in accordance with embodiments of the disclosure. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for authorizing a subscriber of a wireless service provider to access a service even though an Online Charging System (OCS) 126 is totally or partially unavailable. The example process 500 can be performed by the server device 400, or another component, in connection with other components discussed herein. Some or all of the process 500 can be performed by one or more devices, equipment, or components illustrated in FIGS. 1-4, for example.

At 502, an indication of a chargeable event is received from the UE 102. As discussed above, the indication of a chargeable event may be a request by the UE 102 to establish a communication session. The chargeable event may be any event that is associated with generating a charge associated with an OCS 126.

At 504, data is transmitted to an online charging system (OCS) 126 to perform one or more operations that relate to an authorization of the requested communication session. As discussed above, the IMS 110 may transmit a charging request 144A to the OCS 126 for pre-authorization of the communication session. In some examples, the charging request 144A is communicated using the Ro protocol.

At 506, a determination is made that the OCS 126 failed to authorize the communication session. As discussed above, the OCS 126 may be unavailable or partially unavailable. For instance, the OCS 126 may be unreachable due to network conditions and/or hardware problems, and/or one or more of the RO 130 or ABMF 132 may be unavailable, or not working properly. In these situations, the OCS 126 is not able to authorize the requested communication session.

At 508, the communication session is established after the determination that the OCS 126 failed to authorize the communication session. As discussed above, the IMS 110 may determine to establish the requested communication session even though the OCS 126 failed to authorize the communication session. In some examples, the IMS 110 authorizes and establishes the communication session when the OCS 126 is unreachable and/or when portions of the OCS 126 are unreachable (i.e., the ABMF 132 and/or the RF 130).

At 510, a call data record (CDR) 142A for the communication session is generated. As discussed above, a CDR includes information that can be used to charge a subscriber for a call.

At 512, information is associated with the CDR 142A that provides an indication that a subscriber associated with the user device has not been charged or preauthorized by the OCS 126 for the communication session. As discussed above, in some configurations, the IMS 110 tags the CDR 142A to indicate that the subscriber has not been charged.

At 514, second data is transmitted to the OCS 126 to adjust an account of the subscriber to reflect charges for the communication session. As discussed above, since the OCS 126 was not able to authorize the communication session, the billing system 140, billing manager 240, or some other component generates and transmits a charging request 144B to the OCS 126 such that the account of the subscriber is updated for the communication session. The OCS 126 may reply with a CDR 142B that reflects the details for the communication session.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
programming instructions configured to be executed by the one or more processors to perform operations comprising:
receiving, from a first computing device at a wireless communication network, an indication of a chargeable event associated with a communication session between the first computing device and a second computing device;
transmitting data to an online charging system (OCS) to perform one or more operations that relate to an authorization of the communication session;
determining that the OCS failed to authorize the communication session;
establishing the communication session between the first computing device and the second computing device, wherein the communication session is established after the determination that the OCS failed to authorize the communication session;
associating information with a calling data record (CDR) that provides an indication that an account of a subscriber associated with the first computing device has not been charged by the OCS for the communication session; and
transmitting the CDR and the associated information to a billing system to cause the billing system to notify the OCS that the account of the subscriber associated with the first computing device has not been charged by the OCS for the communication session when the OCS becomes available,
wherein the system comprises at least a part of an Internet Protocol Multimedia Subsystem (IMS), and the billing system is separate and distinct from the IMS.

2. The system of claim 1, wherein determining that the OCS failed to authorize the communication session comprises one or more of determining that the OCS failed to respond or determining that the OCS was unable to adjust the account of the subscriber.

3. The system of claim 1, wherein transmitting the data comprises utilizing an Ro protocol.

4. The system of claim 1, wherein the billing system transmits to the OCS a request to adjust the account of the subscriber for the communication session.

5. The system of claim 1, wherein associating the information with the CDR comprises tagging the CDR with an indication that the communication session was not authorized before the communication was established.

6. A computer-implemented method performed by one or more processors configured with specific instructions, the computer-implemented method comprising:
receiving, from a first computing device at a wireless communication network, an indication of a chargeable event associated with a communication session;
transmitting data to an online charging system (OCS) to perform one or more operations that relate to an authorization of the communication session;
determining that the OCS failed to authorize the communication session;
establishing the communication session between the first computing device and a second computing device, wherein the communication session is established after the determination that the OCS failed to authorize the communication session;
associating information with a calling data record (CDR) that provides an indication that an account of a subscriber associated with the first computing device has not been charged by the OCS for the communication session; and
transmitting the CDR and the associated information to a billing system to cause the billing system to notify the OCS that the account of the subscriber associated with the first computing device has not been charged by the OCS for the communication session when the OCS becomes available,
wherein the one or more processors comprise at least a part of an Internet Protocol Multimedia Subsystem (IMS), and the billing system is separate and distinct from the IMS.

7. The computer-implemented method of claim 6, wherein determining that the OCS failed to authorize the communication session comprises one or more of determining that the OCS failed to respond or determining that the OCS was unable to adjust the account of the subscriber.

8. The computer-implemented method of claim 6, wherein transmitting the data comprises utilizing an Ro protocol.

9. The computer-implemented method of claim 6, wherein the billing system requests the OCS to adjust the account of the subscriber for the communication session.

10. The computer-implemented method of claim 6, wherein determining that the OCS failed to authorize the communication session comprises determining that the OCS is unreachable.

11. The computer-implemented method of claim 6, wherein determining that the OCS failed to authorize the communication session comprises determining that one or more of an Account Balance Management Function or a Rating Function associated with the OCS is unreachable.

12. A non-transitory computer-readable media storing computer-executable instructions that, when executed, cause one or more processors of a computing device to perform acts comprising:

receiving, from a first computing device at a wireless communication network, an indication of a chargeable event associated with a communication session;

transmitting data to an online charging system (OCS) to perform one or more operations that relate to an authorization of the communication session;

determining that the OCS failed to authorize the communication session;

causing the communication session that includes the first computing device to be established, wherein the communication session is established after the determination that the OCS failed to authorize the communication session;

associating information with a calling data record (CDR) that provides an indication that an account of a subscriber associated with the first computing device has not been charged by the OCS for the communication session; and transmitting the CDR and the associated information to a billing system to cause the billing system to notify the OCS that the account of the subscriber associated with the first computing device has not been charged by the OCS for the communication session when the OCS becomes available, wherein the computing device is a part of an Internet Protocol Multimedia Subsystem (IMS), and the billing system is separate and distinct from the IMS.

13. The non-transitory computer-readable media of claim 12, wherein determining that the OCS failed to authorize the communication session comprises one or more of determining that the OCS failed to respond or determining that the OCS was unable to adjust the account of the subscriber.

14. The non-transitory computer-readable media of claim 12, wherein transmitting the data comprises utilizing an Ro protocol to communicate with the OCS.

15. The non-transitory computer-readable media of claim 12, wherein determining that the OCS failed to authorize the communication session comprises determining that the OCS is unreachable.

16. The non-transitory computer-readable media of claim 12, wherein determining that the OCS failed to authorize the communication session comprises determining that one or more of an Account Balance Management Function or a Rating Function associated with the OCS is unreachable.

* * * * *